May 24, 1932. F. H. ALBEE 1,859,352
ROTARY PLANT SUPPORT
Filed Dec. 20, 1930
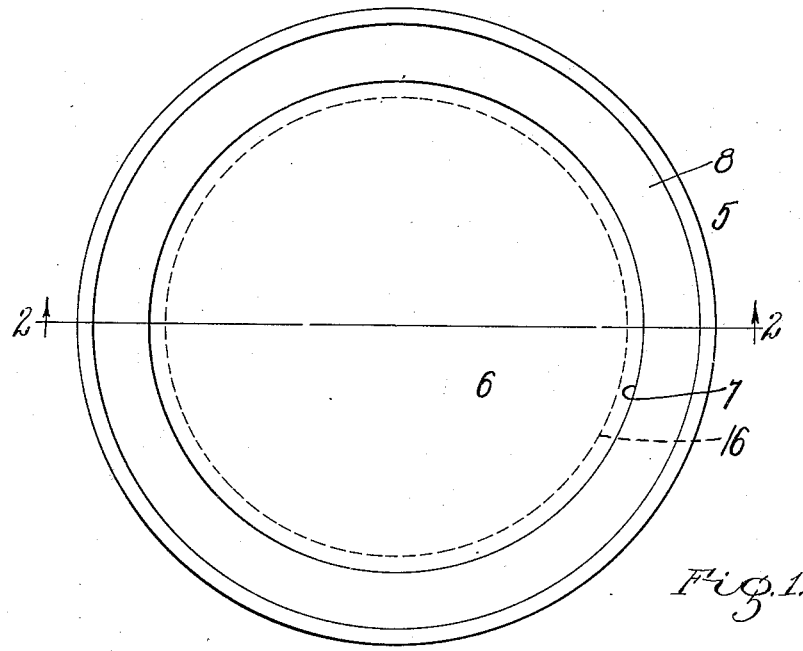
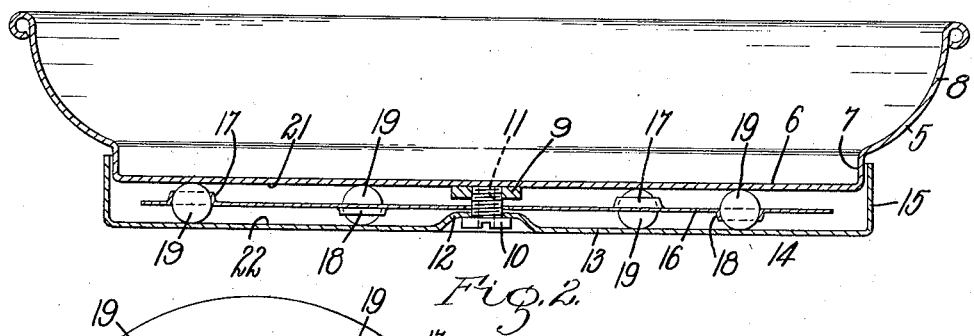
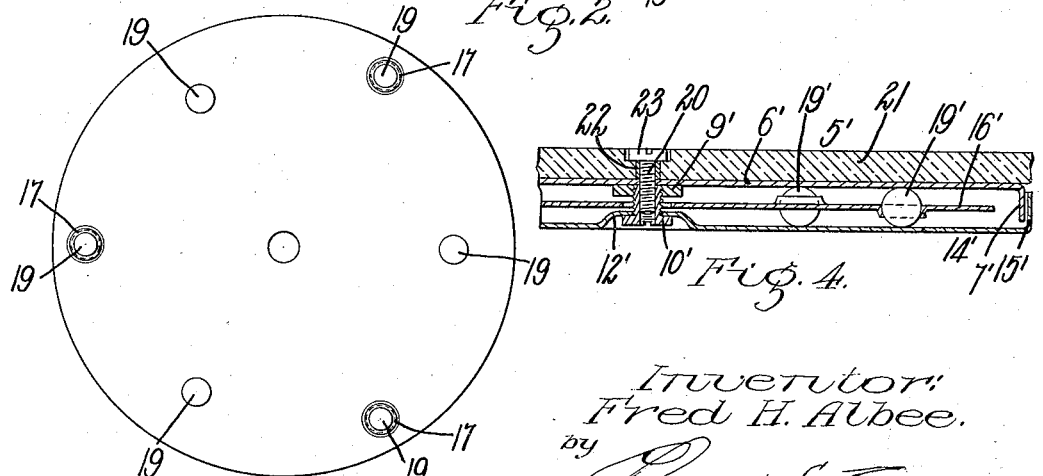
Inventor:
Fred H. Albee.
by Charles S. Gooding
Atty.

Patented May 24, 1932

1,859,352

UNITED STATES PATENT OFFICE

FRED H. ALBEE, OF WINCHESTER, MASSACHUSETTS

ROTARY PLANT SUPPORT

Application filed December 20, 1930. Serial No. 503,704.

This invention relates to a rotary plant support, the object of the invention being to provide a support for a flower pot, fern jardinière, or the like.

It is well known that a plant in order to thrive should be turned from time to time when positioned in a window, so that the sun can shine upon different sides thereof. In cases where the plant and its pot, or a jardinière, are very heavy this act of turning the pot so that the sun will shine upon different sides of the flower, fern, or the like, is neglected and consequently the plant does not thrive.

It is the object of this invention, therefore, to provide a support for the plant and its pot, which can be easily rotated and which at the same time is adapted to perform the functions of a flower pot saucer, that is, to hold water which may be drawn up into the pot through the hole in the bottom thereof for the purpose of irrigating the same.

In some cases it is desirable to use the plant support as a saucer for the pot, in other cases where a large jardinière is used it is desirable to have the same positioned upon a flat disc-like member and it is therefore the object of this invention to provide a plant holder which may be used either as a saucer for a flower pot, or which may be reversed and the face opposite the saucer be used to support a jardinière. In the one case the flower pot saucer is rotatable on a base, in the other case the device is reversed and the flower pot saucer becomes a base and the base becomes a direct support for a jardinière.

The invention further consists in an improved ball-bearing member interposed between the saucer and the base and so constructed that the ball-bearing member will be equally efficient whether the saucer of the holder is uppermost or whether the base is uppermost and, furthermore, the construction of the ball-bearing member is such that there is no rattling or joggling possible between the saucer and the base, while at the same time the saucer can be readily rotated upon the base and when reversed the base can be readily rotated upon the saucer.

The invention consists, therefore, in a rotary plant support of the character hereinbefore set forth and particularly of the construction and combination of parts set forth in the following specification and particularly pointed out in the claims.

Referring to the drawings:—

Fig. 1 is a plan view of my improved rotary plant holder.

Fig. 2 is a sectional elevation on an enlarged scale taken on line 2—2, Fig. 1.

Fig. 3 is a plan view of the ball-bearing member.

Fig. 4 is a sectional elevation, broken away, of a modified form of the plant holder.

Like numerals refer to like parts throughout the several views of the drawings.

In the drawings, Figs. 1 to 3 inclusive, 5 is a saucer formed of sheet metal and comprising a disc 6 constituting the bottom of the saucer, a cylindrical flange 7 on said disc projecting upwardly therefrom and flared outwardly at 8 to form a concavo-convex portion. The bottom 6 of the saucer has a boss 9 thereon which has screw-threaded engagement with a screw 10, the said screw being interiorly screw-threaded at 11 and projecting through a recessed portion 12 of the bottom 13 of a holder 14. The holder 14 is made of sheet metal and has a cylindrical flange 15 thereon into the upper portion of which the cylindrical flange 7 on the saucer 5 projects.

A ball-bearing member 16 is interposed between the two discs 6 and 13 constituting the bottoms of the saucer 5 and the holder or base 14. The ball-bearing member 16 consists of a disc having a series of ball sockets 17 and 18 therein projecting alternately from opposite faces of the disc 16, the sockets 17 projecting upwardly from the disc 16 and the sockets 18 projecting downwardly from the disc 16. A series of balls 19 are positioned in the sockets 17 and 18 and these balls bear against adjacent faces 21 and 22 of the bottoms 6 and 13 respectively of the saucer 5 and the base or holder 14. The sockets 17 are open to the passage of a ball thereinto from the under face of the disc 16 and are closed to the passage of a ball therethrough on that face of the disc 16 from which they project, and the sockets 18 are open to the passage of a ball thereinto from the upper face of the disc 16 and closed to the passage of a ball therethrough on the opposite face of said disc, or lower face of said disc 16.

It will be understood that the screw 10 has screw-threaded engagement with the boss 9 and bears against the bottom disc 6 of the saucer 5, so that said screw is rigidly fastened to the saucer and rotates with it, while the holder 14, or base, and the ball bearing disc 16 are both rotatably mounted upon the screw 10.

The balls 19 bear against the adjacent faces of the discs 6 and 13 constituting the bottoms of the saucer 5 and of the holder 14. The disc 16 is positioned midway between the two discs 6 and 13.

When the plant support is utilized in the position illustrated in Fig. 2 then the flower pot is placed in the saucer 5 and water can be poured into the saucer in the usual manner, the same being watertight, as the pivotal screw or stud 10 does not project through the bottom disc 6 of the saucer and the saucer being supported upon the balls 19 can be readily rotated upon the holder 14.

It will be seen that the disc 16 is positioned midway between the bottom 6 of the saucer 5 and the bottom 13 of the holder 14 and it will retain that position whether the device is placed with the saucer uppermost or with the support 14 uppermost because the sockets 17 prevent the disc 16 from moving away from the bottom 6 toward the bottom 13 and the sockets 18 prevent the disc 16 from moving away from the bottom 13 and toward the bottom 6, so that in either position the ball-bearing member is held in the same position relatively to the adjacent discs 6 and 13 which constitute the bottoms of the saucer 5 and the holder 14 respectively.

The disc 16 constitutes a spacer for the balls 19 to keep them in the same positions relatively to each other and as the disc 16 cannot move toward or away from the discs 6 and 13 it follows that the whole device of the ball-bearing member will be very efficient and will prevent at all times any joggling or rattling of the saucer relatively to the holder 13, or vice versa, whether the saucer be uppermost in use, or whether the holder be uppermost in use.

The device is operated by rotating the saucer 5 when the device is in the position illustrated in Fig. 2, or by rotating the holder 14 when the device is in a reversed position, that is, with the holder uppermost and the saucer underneath and resting upon a suitable table or other support.

In Fig. 4 a modified form of the invention is illustrated in which the holder 14' is substantially the same as the holder 14 illustrated in Fig. 2, the ball-bearing disc 16' is the same as the ball-bearing disc 16 in Fig. 2, and the same is true of the balls 19'. The rotary member 5' differs from the saucer illustrated in Figs. 1 and 2 in that the disc 6' is surrounded by a flange 7' which is turned downwardly within a cylindrical flange 15' on the holder 14'. The disc 6' is reinforced at 9' and has screw-threaded engagement with a screw 10' which is internally screw-threaded to be engaged by a screw 20 which projects through a plate 21. A sleeve 22 is interposed between the head 23 of the screw 20 and the bottom 6' of the rotary member 5' so that by screwing down upon the screw 20 the plate 21 will be firmly fastened to the disc 6' and will rotate with it, that is, the member 5' will rotate with the screws 20 and 10' while the ball-bearing member 16' and the holder 14' are pivoted upon the screw 10' which, when the member 5' is rotated, is free to turn within the ball-bearing member 16' and within the recessed portion 12' of the holder 14'.

By the construction illustrated in Fig. 4 a saucer or plate 5' of glass, or any other desirable material, may be attached to the rotary disc 6' and thus be rotatably mounted upon the holder 14' through the medium of the screws 20 and 10' and the ball-bearing member 16' and balls 19'.

I claim:

1. A rotary plant support having, in combination, a pair of discs pivotally mounted one on the other, a third disc constituting a spacer pivotally mounted therebetween, said third disc having a series of ball sockets therein projecting from each face respectively thereof, the said sockets being open to the passage of a ball thereinto from that face of said disc opposite to that from which they project, and closed to the passage of a ball therethrough on that face of said disc from which they project, and a series of balls in said sockets bearing against the adjacent faces of said two first-named discs.

2. A rotary plant support having, in combination, a sheet metal base comprising a disc and a cylindrical flange on its periphery, a saucer comprising a disc and a cylindrical flange on its periphery, one of said flanges projecting within the other, the flange on the saucer being flared outwardly above the flange on the base to form a concavo-convex upper portion therefor, a ball-bearing member and balls interposed between said base and saucer, and a pivot upon which said base, saucer and ball-bearing member are mounted.

3. A rotary plant support having, in combination, a sheet metal base comprising a disc and a cylindrical flange on its periphery, a saucer comprising a disc and a cylindrical flange on its periphery, one of said flanges projecting within the other, the flange on the saucer being flared outwardly above the flange on the base to form a concavo-convex upper portion therefor, a ball-bearing member and balls interposed between said base and saucer, and a stud fast to said saucer upon which said base and ball-bearing member are rotatably mounted.

4. A rotary plant support having, in combination, a sheet metal base comprising a disc and a cylindrical flange on its periphery, a saucer comprising a disc and a cylindrical flange on its periphery, one of said flanges projecting within the other, the flange on the saucer being flared outwardly above the flange on the base to form a concavo-convex upper portion therefor, a third disc constituting a spacer positioned between said two first-named discs and having a series of ball sockets therein projecting from each face respectively thereof, the said sockets being open to the passage of a ball thereinto from that face of said disc opposite to that from which they project and closed to the passage of a ball therethrough on that face of said disc from which they project, a series of balls in said sockets bearing against the adjacent faces of said two first-named discs, and a pivot upon which said discs are mounted.

5. A rotary plant support having, in combination, a sheet metal base comprising a disc and a cylindrical flange on its periphery, a saucer comprising a disc and a cylindrical flange on its periphery, one of said flanges projecting within the other, the flange on the saucer being flared outwardly above the flange on the base to form a concavo-convex upper portion therefor, a third disc constituting a spacer positioned between said two first-named discs and having a series of ball sockets therein projecting from each face respectively thereof, the said sockets being open to the passage of a ball thereinto from that face of said disc opposite to that from which they project and closed to the passage of a ball therethrough on that face of said disc from which they project, a series of balls in said sockets bearing against the adjacent faces of said two first-named discs, and a stud fast to said saucer upon which said base and spacer are rotatably mounted.

6. A rotary plant support having, in combination, a sheet metal disc and a cylindrical flange on its periphery, a second sheet metal disc and a cylindrical flange on its periphery, one of said flanges projecting within the other, a third disc constituting a spacer positioned between said two first-named discs and having a series of ball sockets therein projecting from each face respectively thereof, the said sockets being open to the passage of a ball thereinto from that face of said disc opposite to that from which they project and closed to the passage of a ball therethrough on that face of said disc from which they project, a series of balls in said sockets bearing against the adjacent faces of said two first-named discs, a stud fast to said first-named disc upon which said other two discs are rotatably mounted, a plate positioned upon the outer face of said first-named disc, and a screw projecting through said plate and into the end of said stud with which it has screw-threaded engagement, whereby said plate may be clamped to said first-named disc.

7. A rotary plant support having, in combination, a sheet metal disc and a cylindrical flange on its periphery, a second sheet metal disc and a cylindrical flange on its periphery, one of said flanges projecting within the other, a third disc constituting a spacer positioned between said two first-named discs and having a series of ball sockets therein projecting from each face respectively thereof, the said sockets being open to the passage of a ball thereinto from that face of said disc opposite to that from which they project and closed to the passage of a ball therethrough on that face of said disc from which they project, a series of balls in said sockets bearing against the adjacent faces of said two first-named discs, a stud fast to said first-named disc upon which said other two discs are rotatably mounted, a plate positioned upon the outer face of said first-named disc, a screw projecting through said plate and into the end of said stud with which it has screw-threaded engagement, and a sleeve interposed between the head of said screw and the first-named disc, whereby said plate may be fastened thereto.

In testimony whereof I have hereunto set my hand.

FRED H. ALBEE.